July 17, 1951 A. NYMAN 2,561,219

PHOTOELECTRIC MODULATOR

Filed March 21, 1950 2 Sheets-Sheet 1

Inventor
Alexander Nyman
by Roberts, Cushman & Grover
Att'y's

Inventor
Alexander Nyman
by Roberts, Cushman & Groves
Att'y's

Patented July 17, 1951

2,561,219

UNITED STATES PATENT OFFICE 2,561,219

PHOTOELECTRIC MODULATOR

Alexander Nyman, Dover, Mass., assignor to Alden Products Co., Brockton, Mass., a corporation of Massachusetts Application March 21, 1950, Serial No. 150,921

30 Claims. (Cl. 332—3)

This invention relates to communication systems wherein a carrier wave train is modulated by an input signal, and is particularly applicable to facsimile devices in which the images to be reproduced are scanned by a photoelectric system to produce signals dependent on the tonal value of light on each element scanned. These signals are in such devices reproduced by suitable recording means in which the tonal value of the trace left on the recording medium is dependent on the electrical signal transmitted.

In scanning systems of this general type as used heretofore it has been usual to employ a photoelectric cell mounted in an optical system so that only a very small elemental area, for example .01'' x .01'', of the copy is passing by the photocell during scanning. The amount of light reflected by such an area is extremely low (a few hundred microlumens at the most) and practical difficulties are encountered when the resulting minute electrical variations are applied to the facsimile control circuits.

It has been usual to superimpose such variations on an electric carrier current of a frequency several times in excess of the keying frequency caused by the passage of elemental areas in front of the photocell. These carrier frequencies have been of the order from 300 to 6000 cycles. It has been usual to introduce modulation of carrier waves in accordnace with the facsimile signal by means of specialized bridge circuits with the object of eliminating or limiting to a minimum the presence of the keying frequencies in the communication channel.

Due to the nature of facsimile scanning, areas of a copy which have constant tone value produce zero keying frequency, whereas areas with interrupted tone values such as the black and white pattern of halftone pictures produce a very high keying frequency. Since the usual transmission channels generally have a cut off at some low frequency such as 300 cycles, keying frequencies of lower values would be attenuated and a line would start out, for example, white and end in gray or black unless such frequencies are entirely eliminated, and the transmission is carried out entirely on a higher carrier frequency. When modulated this will result in a band of frequencies above and below the carrier and the communication channel must have substantially equal attenuation over this range.

Experience has shown that bridge circuits used for the purpose of modulation must balance not only the very high resistance values of photocells and associated circuits, but also any distributed capacity that may be present. Hence in practice an adjustment is necessary whenever the operating frequency is changed. As the operating speeds are increased, the resulting higher keying frequency makes such capacity balance more and more difficult to obtain.

The controls of the type called for by facsimile transmission include a gain control by means of which the general level of transmission is raised. For the standardized arrangement the maximum signal corresponds to black copy and such modulation is referred to as negative, while the alternative in which the white copy gives maximum signal is called positive modulation. Another control is referred to as contrast control and represents the degree of attenuation in the carrier introduced by white copy for negative modulation or by black copy for positive modulation. In the conventional bridge circuits these two controls are interrelated with the result that one setting may result in positive modulation and other settings in negative modulation. These controls are flexible; but great care is required in adjustment calling for specially trained expert personnel to assure correct facsimile transmission. Progress in facsimile art has required higher speeds, smaller apertures and higher light sensitivity from the photocells. The presence of electrode capacities must be minimized which perhaps is best achieved by the use of multiplier photocell in which the output impedance is relatively low even at very low levels of illumination.

The main object of this invention is to provide a system of modulation essentially independent of the carrier frequency and free from disturbing capacity effects.

Other objects are to provide a modulation system which is simple to operate, which has gain and contrast controls which are independently regulated and which do not require adjustment by specially trained personnel.

In one broad aspect the invention contemplates a method of modulating by means of a signal, alternating carrier energy flowing in a communication circuit. This method comprises the steps of separating the opposite phases of the carrier energy whereby such energy flows in two separate channels of the circuit; varying the impedance of the respective channels depending upon said signal; and recombining the modulated opposite phases into a signal modulated output wave.

In another broad aspect the separate communication circuit channels each have a respective modulation element and apparatus comprising means for separating the respective opposite phases of the carrier energy to flow in the respective channels, means for varying the impedances of the modulation elements depending upon said signal; and means for recombining the opposite phases into a signal modulated output wave. Negative modulation results when the channel impedance is decreased depending upon an increase in the magnitude of the signal. When the channel impedance is increased depending upon an increase in the signal magnitude, positive modulation results.

In still another broad aspect the invention contemplates a modulation system of the type suitable for transmitting signals defining a facsimile of an image and comprising a carrier wave generator coupled to a vacuum tube by a network which includes two voltage dividing elements, each of which is also connected in series with a rectifier in a respective input circuit joining the signal source with the cathode and control electrode of the tube. The tube anode and cathode are in series with a second circuit the output of which varies in response to the signal.

In a specific aspect positive modulation is obtained by a system comprising a signal source such as a photoelectric tube of the multiplier type having an anode and a plurality of cathodes supplied with variable direct potentials and responsive to an increase in light due to an optical characteristic of the image. The carrier wave generator is in such a system coupled to the two vacuum tubes of a push-pull circuit by means of a transformer having two secondary windings linked by a center tap which is connected to the cathodes of both of the tubes. Each secondary winding is connected in series with a rectifier and a coupling resistor (which resistor may be the ohmic impedance of the secondary winding) to complete a respective input circuit between the photoelectric tube and a respective control electrode. The secondary windings are also connected in series between the control electrodes.

The transformer can be replaced by a coupling network including a capacitor linking each terminal of the carrier wave generator with a respective control electrode. Resistors are used as voltage dividing elements in series with the respective rectifiers in the input circuits. It is also possible to replace the coupling resistors with inductances, capacitors or any other fixed or adjustable impedance whereby the effects of distributed capacities may be minimized. The output circuit may also include what is termed a "reactance tube" in an oscillatory circuit whereby the amplitude modulation obtained in this modulator is converted into a frequency modulation of the carrier generator or of a radio generator.

To provide negative modulation a coupling transformer having two primary windings is used. The primary windings are connected in series with the terminals of the generator by means of respective resistors. Each resistor is also connected in parallel with the control electrode and cathode of a respective tube. By means of a double pole double throw switch either the resistors in series with the transformer primary windings or the transformer secondary windings can selectively be connected in parallel with the cathodes and control electrodes of the respective tubes thereby to provide either negative or positive modulation.

In another specific aspect the cathode and control electrode of a single vacuum tube are coupled to the carrier wave generator by a transformer having two secondary windings, the center tap of which is linked with the tube cathode. Each of the secondary windings is connected in series with the photoelectric tube or other signal source by a respective rectifier. The cathode and control electrode are also connected in parallel with the transformer primary winding so that the output of a circuit including the tube anode and cathode decreases with an increase in signal magnitude i. e. negative modulation. To obtain positive modulation the tube cathode and control electrode are connected in parallel with a resistor in series with the carrier wave generator and the transformer primary winding.

A feature of the invention is the possibility of independently adjusting the contrast and gain controls. The gain is controlled by an attenuator which may be located in the coupling network or the output circuit. In the push-pull circuits the attenuator can also be connected between the control electrodes of the respective tubes.

The contrast (the relative output with a modulating signal as compared to the output in the absence of a signal) may be controlled by providing an adjustable potential to the source of the input signal. Such a control method is very sensitive when a photoelectric tube of the type with an anode and a plurality of multiplier electrodes having a variable supply of direct potentials connected thereto is used as the input signal source. Any small change in the cathode potentials is reflected in the output as a large variation because of the multiplying action of the photoelectric tube.

In the push-pull circuits contrast may also be controlled by making the impedances or resistors in the respective input circuits variable and providing a mechanical link therebetween so that the ohmic characteristics thereof are conjointly variable. The single tube circuits are controlled in an analogous manner by adjustment of the resistor connected in series with the transformer primary winding and the carrier wave generator.

The modulation circuits as described above provide a maximum modulation of approximately 50 percent thereby giving sufficient contrast for the usual facsimile reproduction. Another important feature of this invention is a simple modification which permits modulations of approximately 95 percent. By connecting a source of direct potential between the center tap of the transformer secondary windings and ground, a bias is placed upon the photoelectric tube circuit. This bias is of such polarity as to oppose the polarity of the carrier wave during the half cycle that the tube anode is negative with respect to the cathode or cathodes. When the magnitude of the biasing potential is greater than the potential of the transformer secondary, the illuminated photoelectric tube no longer acts as a rectifier but conducts during both cycles of the carrier waves. One convenient method of obtaining such a potential is to use the bias voltage drop across the resistor in series with the cathode of the vacuum tube (or tubes) in the output circuit.

This and other aspects, features and objects of the invention will be apparent from the following detailed description of several embodiments of the invention and the accompanying drawings wherein:

Fig. 1 is an embodiment of a push-pull circuit according to the invention whereby a negative modulation of the carrier wave is obtained;

Fig. 2 graphically represents the potentials upon the respective control electrodes and the anode current of the tube V3 in Fig. 1 as a function of time without a biasing potential upon the tube P1;

Figure 1:
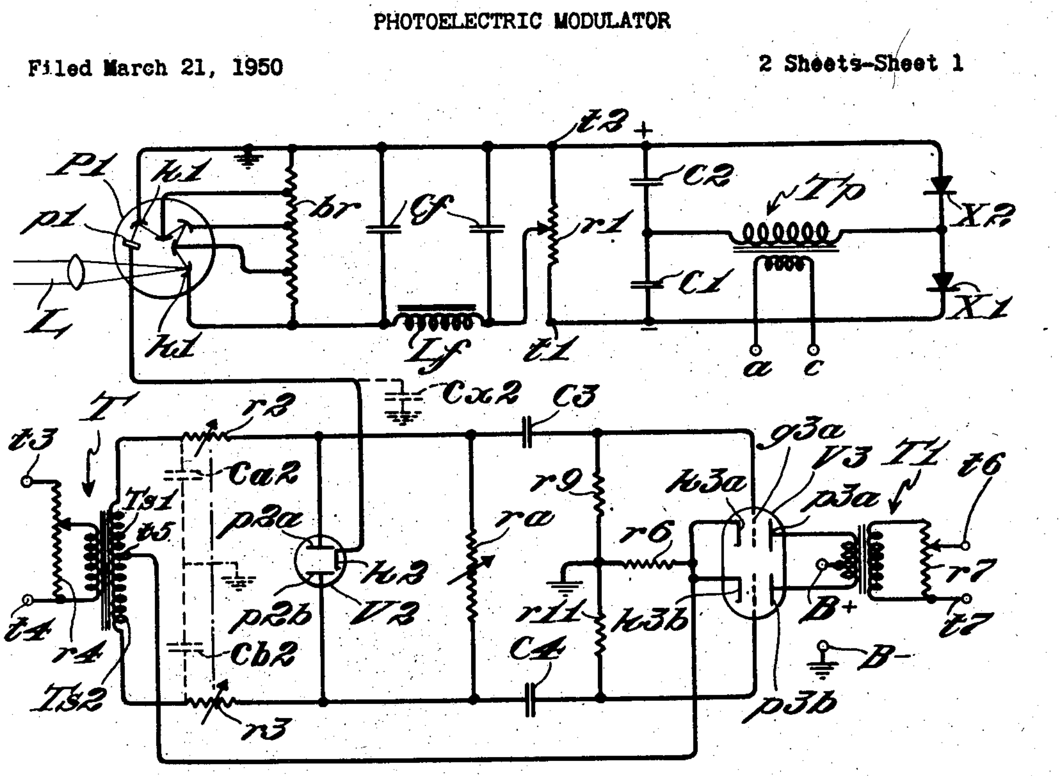

In the embodiment shown in Fig. 1, the input signal source comprises a photoelectric tube P1 of the multiplier type having an anode p1 and a plurality of cathodes k1 illuminated by a light beam L from the image (not shown) which is carried on a cylinder or by any other type of convention scanning apparatus. The cathodes k1 are provided with successively increasing direct potentials from a tapped bleeder resistor br connected to the output terminals of the filter section of a direct potential source. The filter section is of conventional pi construction comprising a series connected choke Lf with two capacitors Cf connected to the respective terminals thereof in parallel with the resistor br. It will be noted that the positive terminal of the potential source which directly links with the first cathode k1 is at ground potential.

The primary winding of a power supply transformer Tp is connected to the terminals a and c of an alternating power supply (not shown). One terminal of the transformer secondary winding is connected to the common junction of the leads to a pair of capacitors C1 and C2. The other secondary winding terminal is joined to the common junction of the two rectifying elements X1 and X2 which may be either the copper oxide type shown or a diode vacuum tube. The other leads from the capacitor C2 and the rectifying element X2 respectively are connected to the positive input terminal t2 of the filter section. The other input terminal t1 is linked to the capacitor C1 and the rectifying element X1 in an analogous manner.

An attenuator such as the variable potentiometer r1 is connected between the terminals t1 and t2. Adjustment of this potentiometer r1 changes the respective voltages upon the cathodes k1 and therefore the output of the phototube P1. Because of the multiplying action of the cathodes k1 very small changes in cathode potential result in large tube output variations so that the potentiometer r1 provides a very sensitive control.

The anode p1 of the photoelectric tube P1 is connected to the cathode k2 of a rectifier such as the double diode vacuum tube V2. The diode anodes p2a and p2b are connected to two voltage dividing elements such as the secondary windings Ts1 and Ts2 of a transformer T by the mechanically linked variable resistors r2 and r3 respectively. The primary winding of the transformer T is coupled to the terminals t3 and t4 of a carrier wave generator (not shown) by means of an attenuator such as the potentiometer r4.

It will be noted that action of the double diode V2 as a full wave rectifier is only incidental; its object is to direct the input signal into two parallel input circuits or channels, one including the anode p2a, the resistor r2 and the secondary winding Ts1; the other including the anode p2b, the resistor r3 and the secondary winding Ts2. To provide a return path to the photoelectric tube P1, the common center tap t5 of the series connected secondary windings Ts1 and Ts2 is connected to ground through a resistor r6 which also supplies a bias for the control electrodes g3a and g3b of a double triode V3.

The tube V3 is connected as a push-pull amplifier by linking the anodes p3a and p3b with the respective end terminals of a primary winding of an output transformer T1. The anode power supply (not shown) is connected to the terminals designated B+ and B−. The output circuit is completed by coupling the secondary winding of the transformer T1 to the output terminals t6 and t7 by means of an attenuator such as the potentiometer r7.

The control electrodes g3a and g3b are coupled to the resistors r2 and r3 by the capacitors C3 and C4 respectively, to complete the network coupling the carrier wave generator to the control electrodes and cathodes of the tube V3. A resistor r9 is connected between ground and the control electrodes g3a to provide a return path therefor. Electrode g3b is similarly grounded by a resistor r11. An attenuator, such as the potentiometer ra is connected between the control electrodes g3a and g3b.

The increased reactance of the windings of transformer T at high carrier frequencies results in attenuation in the image, when frequencies approaching 60 mc. are used. The modification shown in Fig. 6 overcomes this difficulty by replacing the transformer T by the coupling capacitors C5 and C6. To obtain a balanced potential point t'5 with respect to ground, voltage dividing elements such as the resistors R1 and R2 are connected in series between the common junctions of capacitor C5 and resistor r2 and capacitor C6 and resistor r3 respectively. Two resistors R3 and R4 with a grounded common junction therebetween are connected across the oscillator output terminals t3 and t4.

To permit a greater flexibility in adjustment of the photocell biasing potential applied to the balanced point t'5, this potential is obtained directly from the B+ supply through the series resistors r15 and r20 rather than from the grid biasing resistor r6 as in Fig. 1. The remaining circuit elements in Fig. 6 have the same indicia and perform analogous functions to the elements in Fig. 1.

Figures 4, 5, 6:
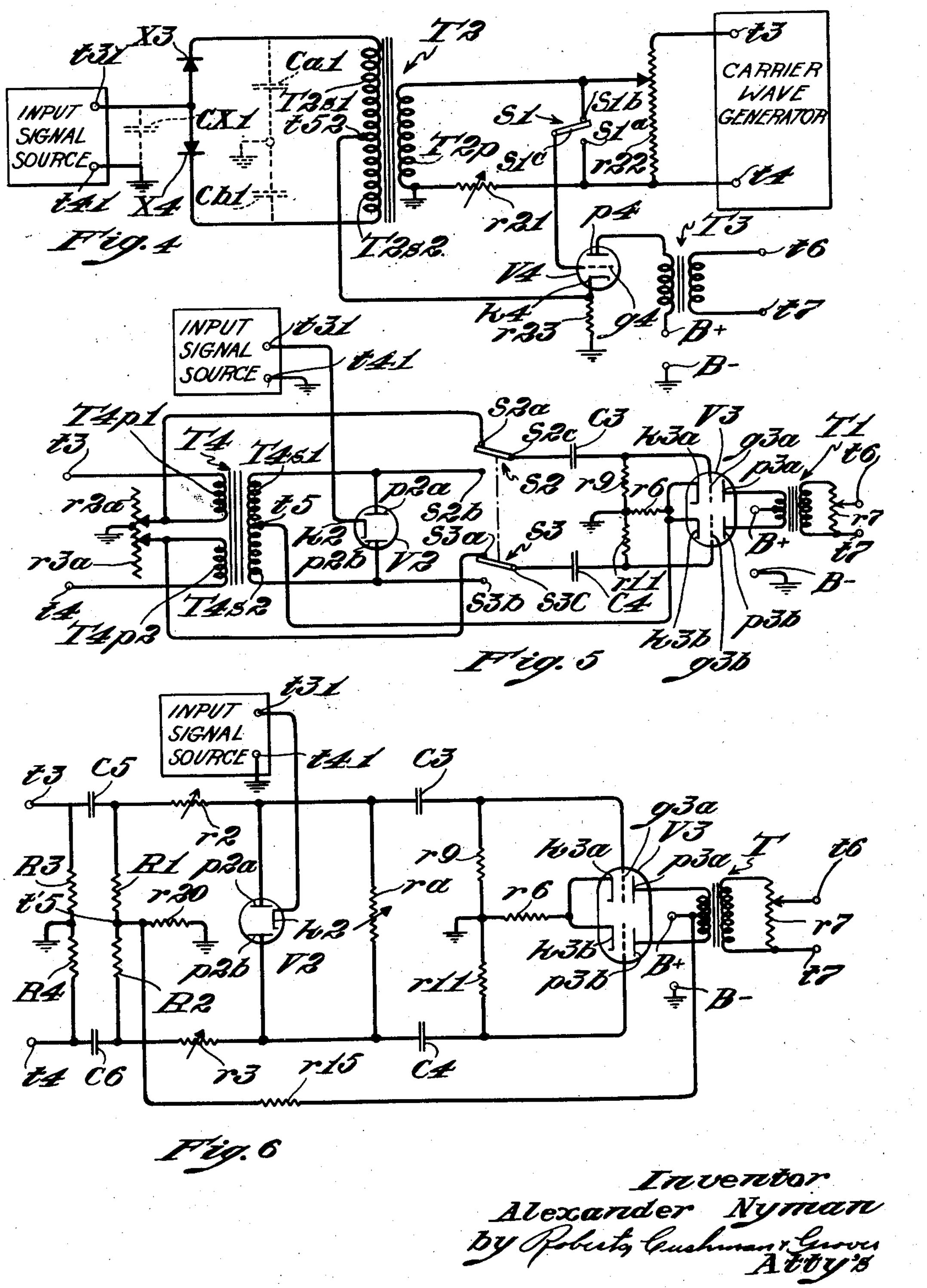
Fig. 4 is another embodiment of the invention wherein a single tube is used to provide either positive or negative modulation.
Fig. 5 is a third embodiment with a push-pull amplifier arranged to give either positive or negative modulation.
Fig. 6 is a modification of the embodiment shown in Fig. 1 for use with a high frequency carrier wave generator.

*Operation of the circuit according to Figs. 1 and 6*

Figures 2, 3:
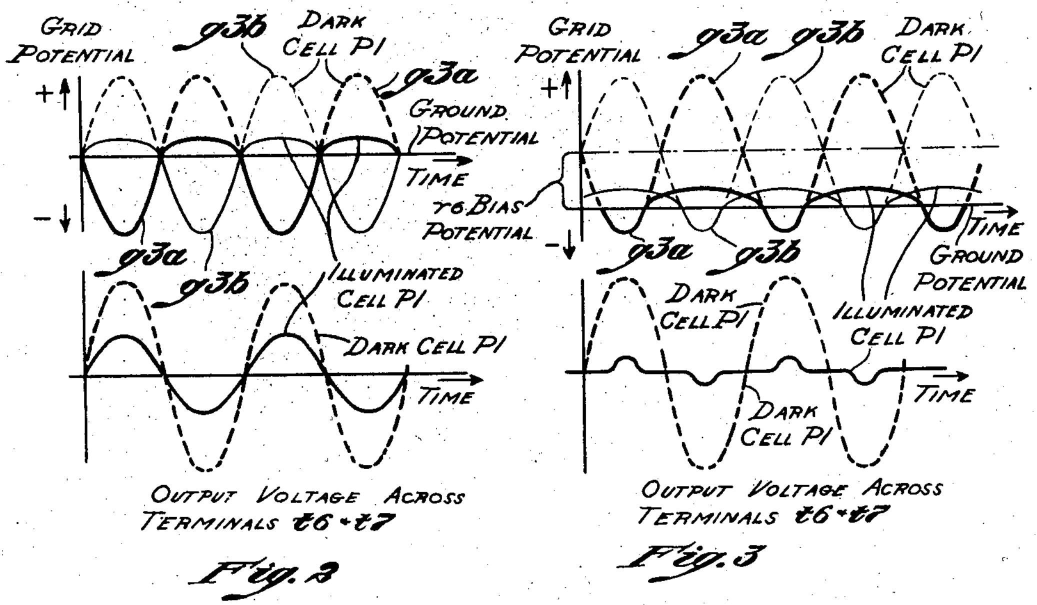
Fig. 3 illustrates the relationship between the same quantities with a biasing potential upon the tube V1 which is slightly less in magnitude than the voltage across the secondary winding of the transformer T.

Whenever because the optical characteristics of the image being scanned are such that the internal impedance of the tube P1 is high, for example, when no light is reflected because of a dark portion of the image in the path of the scanning beam L, the potential wave appearing upon the control electrodes g3a and g3b is that of the carrier wave with an amplitude as modified by the transformer T. If for the purposes of illustration the center tap t5 is considered connected either directly to ground or through a resistor r6 having a very low ohmic characteristic, the variation of the potentials on the respective control electrodes g3a and g3b as a function of time is shown as the two upper broken curves in Fig. 2, represents opposite phases of the carrier wave.

When light does fall on the photoelectric tube P1, its internal impedance decreases so that a current flows through the series resistors r2 and r3, the correlated transformer secondary windings Ts1 and Ts2 and the resistor r6 to ground. During the positive half cycles of the potential wave, the voltage drop in the resistors r2 and r3 is such as to oppose the transformed carrier wave potential so that the resulting potential impressed upon the respective control electrodes g3a and g3b is reduced as is shown by the solid lines in Fig. 2. During the negative portion of the cycle the polarity of the carrier wave potential prevents the diode V2 from conducting so that the potential on the control electrodes is that of the carrier wave as is shown by the solid lines. The output potentials across terminals t6 and t7 of the output transformer T1 secondary winding with and without illumination falling upon the photoelectric tube P1 are shown respectively by the lower solid and broken lines. Modulation up to 50 percent is obtainable with this circuit.

Modulations exceeding 95 percent are obtainable practically by making the direct voltage drop through the resistor r6 of greater magnitude than the peak potential in the secondary winding of the transformer T resulting from the unmodulated carrier wave. The resulting potentials upon the respective control electrodes g3a and g3b with a biasing potential of slightly less magnitude than that of the carrier wave is shown in Fig. 3, the broken lines indicating the respective potentials of the two opposite phases upon the control electrodes g3a and g3b and across the output terminals t6 and t7 respectively with no incident light upon the photocell P1. It will be noted that the potentials upon the respective control electrodes g3a and g3b are similar in shape and amplitude to the analogous wave shown in Fig. 2, but are displaced above ground potential by positive voltage equal in magnitude to the potential drop through the resistor r6 [or r20 in Fig. 6].

When the phototube P1 is illuminated, the resulting current flow in the input circuits through the tube V2 and the series resistors r2 and r3 to ground through the transformer T windings (or resistors R1 and R2) and resistors r6 (or r20), is in such a direction as to oppose the positive portion of the carrier wave. The resulting potentials on the control electrodes g3a and g3b is shown by the solid lines. The resultant modulation of the output wave across terminals t6 and t7 approaches 100 percent; the ripple being due to the slight negative swing of the grid potentials during each cycle.

Oscilloscope observations indicate that the bias on the photoelectric tube P1 supplied by the resistor r6 (or r20) is not critical. If this bias voltage exceeds the peak value of the negative voltage applied to the illuminated phototube P1 by the transformer secondary windings Ts1 and Ts2, an excess direct current will flow through the tube and a drop of potential will occur in both resistors r2 and r3. Such a potential drop will be applied to both control electrodes g3a and g3b at facsimile frequency rather than carrier frequency. Due to the push-pull connection of these control electrodes and a common grid bias unshunted by a capacitor, the effect of this frequency upon the control electrode is minimized in the output push-pull circuit.

Contrast is preferably controlled by the potentiometer r1 which varies the respective potentials supplied to the cathodes k1 of the photoelectric tube P1 and thereby changes the impedance the tube P1 presents to the flow of a modulating current through resistors r2 and r3. If another signal source is used, the contrast can be changed by varying the ohmic characteristics of the resistors r2 and r3 conjointly by mechanical link. In either case the potential drop in the resistors r2 and r3 and therefore the potential upon the control electrodes g3a and g3b for any given amount of incident light is varied with respect to the carrier wave amplitude.

The overall gain in the system is controlled by attenuating the magnitude of the output. This may be accomplished by the potentiometer ra. The potentiometer r7 in the output network is preferred because the contrast control is completely independent thereof. The potentiometer such as r4 located in the coupling network only attenuates the carrier wave, but if properly proportioned with respect to the remaining circuit elements will perform satisfactorily.

In Fig. 4 is shown an embodiment incorporating a single vacuum tube V4. By the operation of a single pole double throw switch S1, this embodiment may be used to either positively or negatively modulate the carrier wave. A coupling network including the primary winding T2p of a transformer T2 and a variable resistor r21 are connected in series with the variable tap of a potentiometer r22, the winding of which is coupled to the output terminals t3 and t4 of a carrier wave generator. The common junction of the terminals of primary winding T2p and the resistor r21 is grounded. The ungrounded terminals of the primary winding T2p and the resistor r21 are connected to respective stationary contacts s1b and s1a of the switch S1.

The moving contact s1c of the switch S1 is linked with the control electrode g4 of the vacuum tube V4. The tude anode p4 is connected in series with the B+ terminal of a direct power supply (not shown) by the primary winding of an output transformer T3. The output network is completed by linking the ends of secondary winding of the transformer T3 with the output terminals t6 and t7 respectively. Grid bias for the tube V4 is obtained by grounding the cathode k4 through a resistor r23.

One end of the secondary winding T2s1 of the transformer T2 is linked to an adjacent end of the secondary T2s2 by a center tap t52 so that these windings act as voltage dividing elements. The tap t52 is also connected to the cathode k4 so that the input signal source is biased by the voltage drop through the resistor r23. The other ends of the respective secondary windings T2s1 and T2s2 are coupled to the input terminal t31 of the input signal source by means of the rectifiers X3 and X4 respectively. The other input signal source terminal t41 is grounded.

*Operation of the embodiment shown in Fig. 4*

Energization of the carrier wave network causes an alternating current to flow through the transformer primary winding T2p and the resistor r21. With the moving contact s1c of the switch S1 making with the contact s1b as, in the position shown in Fig. 4, this current causes a voltage drop across the secondary winding T2p which is applied across the tube V4 between the control electrode g4 and the grounded terminal of the biasing resistor r23. The variation of control electrode potential results in a current through the tube V4 so that an unmodulated voltage wave appears at the output terminals $t6$ and $t7$ in the absence of an input signal.

When an input signal causes a current flow through the parallel input circuits provided by rectifiers X3 and X4 and the respective secondary windings T2sa and T2sb to ground through the resistor r23, the effect upon the primary winding T2p is equivalent to a decrease in its impedance. This decreased impedance results in a lesser potential drop taking place across such primary winding T2p and, therefore, across the connected control electrode g4 so that the output of the tube V4 is reduced. It will be apparent that such reduction in output in response to an increase in input signal is negative modulation as defined heretofore.

When the moving contact s1c of the switch S1 is thrown to make with the contact s1a, as in the opposite position to that shown in Fig. 4, the voltage drop in the resistor r21 rather than the drop in the primary winding T2p is applied across the control electrode g4. In this position the decrease in the impedance and the corresponding voltage drop across the primary winding T2p resulting from an increase in input signal current causes an increase in the amount of voltage drop across the resistor r21 and the coupled control electrode g4. This increased output is in response to an increase in the input signal i. e. positive modulation.

Contrast is controlled in the above circuit by varying the voltage of the input signal source in a manner analogous to that described heretofore in connection with the first embodiment. Another convenient method is to vary the ohmic characteristic of the resistor r21 and thereby the voltage drop across the control electrode g4. The gain is controlled by the potentiometer r22 of the carrier wave network; or by an attenuator (not shown) in the output circuit similar to that described heretofore in connection with the embodiment shown in Fig. 1.

Ca1 and Cb1 represent the distributed capacity to ground of the secondary windings T2s1 and T2s2 respectively. The input source circuit and the rectifiers X3 and X4 also have a distributed capacity to ground represented by Cx1. The effects of these capacitors is to shunt the secondary windings T2s1 and T2s2 of the transformer T2 with a definite impedance which is quite low at higher carrier frequencies. This impedance is always in the circuit, hence its effect is to reduce effective impedance of the windings of the transformer across which the voltage drop applied to the tube V4 appears so that the contrast between the black and white level in either the positive or negative modulation position of the switch S1 is reduced.

In Fig. 1, the distributed capacitances to ground of the transformer secondary windings Ts1 and Ts2 are represented by the capacitors Ca2 and Cb2 respectively. The capacitor Cx2 represents the capacitance to ground of the input circuit linking the phototube P1 and the cathode k2 of the rectifier tube V2. It will be noted that one of the advantages of the push-pull circuits in Figs. 1 and 6 over the single tube circuit of Fig. 4 is that both the carrier wave current and the signal source current pass through the secondary winding Ts1 and Ts2 and are partially shunted to ground by the capacitors Ca2 and Cb2. When both currents are reduced in magnitude, the contrast is not effected substantially. As the shunting action of the input circuit capacitor Cx2 is present in all cases care should be taken in the design of this circuit to keep the capacitance to ground at a minimum.

A further advantage of the push-pull circuits is that potential of the signal frequency is suppressed by the degenerative action of the common cathode bias resistor and the push-pull output transformer thereby eliminating the attenuation difficulties mentioned heretofore.

In Fig. 5 is shown another embodiment of a push-pull circuit modified so that the carrier wave can be selectively modulated either positively or negatively. In this circuit the output terminal t3 of the carrier wave generator (not shown) is connected to an end of one primary winding T4p1 of a transformer T4. The other generator output terminal t4 is connected in an analogous manner to the corresponding end of a second primary winding T4p2. The opposite ends of the primary windings T4p1 and T4p2 are connected to ground through the variable resistors r2a and r3a respectively. The ungrounded terminal of resistor r2a is also connected to a stationary contact s2a of a single pole double throw switch S2. The ungrounded terminal of resistor r3a is connected to contact s3a of a similar switch S3. The other stationary contact s2b of the switch S2 is connected to one end of the transformer secondary winding T4s1; the stationary contact s3b being linked to the corresponding end of the secondary winding T4s2 in an analogous manner. The movable switch contacts s2c and s3c are connected by the coupling capacitors c3 and c4 to the grids g3a and g3b respectively. The switch S2 and S3 are thrown conjointly by means of a mechanical link.

The remainder of the circuit elements are similar to and carry the same indicia as the embodiment shown in Fig. 1; the rectifier tube V2 for connecting the input signal source and the push-pull amplifier tube V3 being connected in the same manner as has been described in detail heretofore.

*Operation of the circuit according to Fig. 5*

With the switches S2 and S3 in the position shown so that the movable contacts s2c and s3c make with the contacts s2a and s3a respectively, the operation of the circuit is analogous to the single tube circuit shown in Fig. 5. The application of a rectified input signal current to the secondary windings T4s1 and T4s2 decreases the effective impedance of the primary windings T4p1 and T4p2 of the transformer T4. With a constant amplitude carrier wave applied across the terminals t3 and t4 a decrease in the impedance of the primary windings T4p1 and T4p2 increases the voltage drop across the correlated resistors r2a and r3a which drop is applied to the control electrodes g3a and g3b respectively. The increase in potential on the control electrodes g3a and g3b increases the output voltage across the terminals t6 and t7 i. e. positive modulation takes place.

With the switches S2 and S3 thrown to the position so that the movable contacts s2c and s3c make with the respective contacts s2b and s3b, the control electrodes g3a and g3b are connected across the secondary winding T4s1 and T4s2 respectively. With no input signal current, the carrier wave from the terminals t3 and t4 flowing in the primary windings T4p1 and T4p2 induces a potential in the secondary windings T4s1 and T4s2 which is impressed upon the control electrodes g3a and g3b by coupling capacitors c3 and c4 respectively.

The flow of a rectified current from the input signal source in parallel input circuits through the respective secondary windings T4s1 and T4s2 and the resistor r6 to ground, produces voltage drops in the resistors r2a and r3a opposing the carrier voltage at the terminals t3 and t4 thereby reducing the voltage at the primary and secondary windings of the transformer T4. The net positive potentials impressed upon the respective control electrodes g3a and g3b are thereby reduced so that the voltage across the output terminals t6 and t7 is decreased i. e. negative modulation of the carrier wave results.

It will be noted that in this circuit the control electrode potentials during positive modulation are taken from across the secondary winding rather than the primary winding of the transformer as was done in the circuit shown in Fig. 4 so that it is not necessary to reverse the connection of the primary windings T4p1 and T4p2 and the resistors r2a and r3a with respect to ground. It will also be noted that the input signal source circuit through the rectifier tube V2 to the secondary windings tap t5 is not changed by the operation of switches S2 and S3 and can, therefore, be designed for a minimum distributed capacity to ground.

It should be understood that the present disclosure is for the purpose of illustration only and that this invention includes all modifications and equivalents which fall within the scope of the appended claims.

I claim:

1. A modulation system of the type suitable for transmitting signals defining a facsimile of an image comprising a carrier wave generator, an input signal source responsive to modification of light due to an optical characteristic of the image, a vacuum tube having an anode, a cathode and a control electrode, a coupling network interposed between said generator and said tube, said network including voltage dividing elements, two input circuits each including a rectifier and a respective voltage dividing element in series between the signal source and said cathode and said control electrode, and an output circuit including in series said anode and said cathode, the output of said circuit varying in response to said signal.

2. A modulation system of the type suitable for transmitting signals defining a facsimile of an image comprising a carrier wave generator, an input signal source responsive to an increase of light due to an optical characteristic of the image, a vacuum tube having an anode, a cathode and a control electrode, a coupling network interposed between said generator and said tube, said network including an impedance in parallel with the cathode and control electrode and voltage dividing elements, two input circuits each including a rectifier and a respective voltage dividing element in series, and an output circuit including in series said anode and said cathode, the output of said circuit decreasing in response to an increase in the quantity of light received from the image.

3. A modulation system of the type suitable for transmitting signals defining a facsimile of an image comprising, a carrier wave generator, an input signal source responsive to an increase of light due to an optical characteristic of the image, a vacuum tube having an anode, a cathode and a control electrode, a coupling network interposed between said generator and said tube, said network including a resistor in parallel with the cathode and control electrode, voltage dividing elements, two input circuits each including a rectifier and a respective voltage dividing element in series between the signal source and said cathode and said control electrode, and an output circuit connected in series with said anode and said cathode, the output of said circuit increasing in response to an increase in the quantity of light received from the image.

4. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network including voltage dividing elements interposed between said generator and said control electrodes, and an input circuit including a rectifier, an impedance and one of said voltage dividing elements connected in series between each of the respective control electrodes and said photoelectric tube, said voltage dividing elements also being connected in series between said control electrodes whereby the carrier wave is impressed in opposite phase upon the respective control electrodes, the output of said push-pull circuit decreasing in response to an increase in the quantity of light received from the image.

5. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network with two impedances interposed between said generator and said control electrodes, said network also including two voltage dividing elements connecting in series between said control electrodes, and an input circuit including a rectifier connected between each of the respective voltage dividing elements and the photoelectric tube whereby the carrier wave is impressed in opposite phases upon the respective control electrodes, the output of said push-pull circuit increasing in response to an increase in the quantity of light from the image.

6. A modulation system of the type suitable for transmitting signals defining a facsimile of an image comprising a carrier wave generator, a photoelectric tube responsive to an increase of light due to an optical characteristic of the image, a vacuum tube having an anode, a cathode and a control electrode, voltage dividing elements, a coupling network interposed between said generator and said tube, an input circuit including a rectifier connected between each of said voltage dividing elements and said photoelectric tube, and an output circuit including said anode and said cathode, the output of said circuit decreasing in response to an increase in the quantity of light received from the image.

7. A modulation system of the type suitable for transmitting signals defining a facsimile of an image comprising a carrier wave generator, a photoelectric tube responsive to an increase of light due to an optical characteristic of the image, a vacuum tube having an anode, a cathode and a control electrode, a coupling network with a resistor interposed between said generator and said tube, said network also including two voltage dividing elements, an input circuit including a rectifier connected between each of said voltage dividing elements and said photo-electric tube, and an output circuit connected in series with said anode and cathode, the output of said circuit increasing in response to an increase in the quantity of light received from the image.

8. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a variable supply of direct potentials connected to said respective cathodes, a push-pull circuit with two vacuum tube elements each having an anode, a cathode and a control electrode, a transformer having a primary and two secondary windings linked by a center tap connected to one of said photocell cathodes, and two input circuits connecting the respective control electrodes to said photoelectric tube, each of said circuits including in series a rectifier, a resistor and one of said secondary windings, said secondaries also being connected in series, said primary being connected with said generator whereby the carrier wave is impressed with opposite phases upon the respective control electrodes, the output of said push-pull circuit decreasing in response to an increase in the quantity of light received from the image, the relative output decrease being determined by the potentials upon the cathodes of said photoelectric tube.

9. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a variable supply of direct potentials connected to said respective cathodes, a push-pull circuit with two vacuum tube elements each having an anode, a cathode and a control electrode, a capacitor coupling each respective control electrode with said generator, and two input circuits connecting the respective control electrodes to said photoelectric tube, each of said circuits including in series a rectifier and two resistors, the first resistor in each input circuit also being connected in series with one of the capacitors and its associated control electrode, the second resistor being connected in series with the corresponding resistor in the other input circuit, the common terminal of the second resistors being linked with said cathodes, whereby the carrier wave is impressed in opposite phase upon the respective control electrodes, the output of said push-pull circuit decreasing in response to an increase in the quantity of light received from the image, the relative output decrease being determined by the potentials upon the cathodes of said photoelectric tube.

10. A modulation system of the type suitable for transmitting signals defining a facsimile of an image comprising a carrier wave generator, a photoelectric tube of the multiplier type having an anode and a plurality of cathodes, responsive to an increase of light due to an optical characteristic of the image, a variable supply of direct potential connected to said respective cathodes, a push-pull circuit with two vacuum tubes each having an anode, a cathode and a control electrode, a transformer having a pair of primary windings and a pair of series connected secondary windings with a common center tap linked to said cathodes, and two input circuits each including a rectifier connecting the respective secondary windings with said photoelectric tube, two resistors connecting the primary windings in series with said generator, each resistor also being in parallel with the control electrode and cathode of a respective tube whereby the carrier wave is impressed in opposite phases upon the respective control electrodes, the output of said push-pull circuit increasing in response to an increase in the quantity of light from the image, the relative output increase being determined by the potential upon the cathodes of said photoelectric tube.

11. A modulation system of the type suitable for transmitting signals defining a facsimile of an image comprising a carrier wave generator, a photoelectric tube of the multiplier type having an anode and a plurality of cathodes, responsive to an increase of light due to an optical characteristic of the image, a variable supply of direct potential connected to said respective cathodes, a push-pull circuit with two vacuum tubes each having an anode, a cathode and a control electrode, a transformer having a pair of primary windings and a pair of series connected secondary windings with a common center tap linked to said cathodes, two input circuits each including a rectifier connecting the respective secondary windings with said photoelectric tube, two resistors connecting the primary windings in series with said generator, and a double throw double pole switch one position of which connects each of said resistors in parallel with the control electrode and cathode of a respective tube whereby the carrier wave is impressed in opposite phases upon the respective control electrodes, the output of said push-pull circuit increasing in response to an increase in the quantity of light from the image, the other switch position connecting each of said secondary windings in parallel with the control electrode and cathode of a respective tube whereby the output of the push-pull circuit decreases in response to an increase in the quantity of light from the image, the relative output variation being determined by the potential upon the cathodes of said photoelectric tube.

12. A modulation system of the type suitable for transmitting signals defining a facsimile of an image comprising a photoelectric tube of the multiplier type having an anode and a plurality of cathodes responsive to an increase of light due to an optical characteristic of the image, a variable supply of direct potentials connected to said respective cathodes, a vacuum tube having an anode, a cathode and a control electrode, a transformer having two series connected secondary windings with a center tap therebetween connected to said cathode and a primary winding, the terminals of which are coupled to the cathode and control electrode respectively, a carrier wave generator connected in parallel with said primary winding, a rectifier connecting each of the respective secondary windings to said photoelectric tube, and an output circuit including in series said anode and said cathode, the output of said circuit decreasing in response to an increase in the quantity of light received from the image, the relative output decrease being determined by the potentials upon the cathodes of said photoelectric tube.

13. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a variable supply of direct potentials connected to said respective cathodes, a vacuum tube having an anode, a cathode and a control electrode, a transformer having two series connected secondary windings with a center tap therebetween connected to said cathode and a primary winding, a resistor connected in series with said primary winding and said generator, said resistor also being connected in parallel with the cathode and control element of said vacuum tube, a rectifier connecting each of the respective secondary windings to said photoelectric tube, and an output circuit including in series said anode and cathode, the output of said circuit increasing in response to an increase in the quantity of light received from the image, the relative output increase being determined by the potentials upon the cathodes of said photoelectric tube.

14. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a variable supply of direct potentials connected to said respective cathodes, a vacuum tube having an anode, a cathode and a control electrode, an output circuit including in series said anode and cathode, a transformer having two series connected secondary windings with a center tap therebetween linked to one of said photocell cathodes and a primary winding, a rectifier connecting each of the respective secondary windings to said photoelectric tube, a resistor connected in series with said primary winding and said generator, and a double throw single pole switch one position of which connects said resistor in parallel with the cathode and control element of said vacuum tube, whereby the output of said circuit increases in response to an increase in the quantity of light received from the image, the other switch position connecting the primary winding in parallel with the control electrode and cathode of said tube, whereby the output of said circuit decreases in response to an increase in the quantity of light received from the image, the relative output variation being determined by the potentials upon the cathodes of said photoelectric tube.

15. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network including variable voltage dividing elements interposed between said generator and said control electrodes, and an input circuit including a rectifier, an impedance and one of said voltage dividing elements connected in series between each of the respective control electrodes and said photoelectric tube, said voltage dividing elements also being connected in series between said control electrodes whereby the carrier wave is impressed with opposite phases upon the respective control electrodes, the output of said push-pull circuit decreasing in response to an increase in the quantity of light received from the image, the relative output decrease being determined by the adjustment of said impedances.

16. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network with two variable impedances interposed between said generator and said control electrodes, said network also including two voltage dividing elements connecting in series between said control electrodes, and an input circuit including a rectifier connected between each of the respective voltage dividing elements and the photoelectric tube whereby the carrier wave is impressed in opposite phases upon the respective control electrodes, the output of said push-pull circuit is increased in response to an increase in the quantity of light from the image, the relative output increase being determined by the adjustment of said impedances.

17. A modulation system of the type suitable for transmitting signals defining a facsimile of an image comprising a carrier wave generator, a photoelectric tube responsive to an increase of light due to an optical characteristic of the image, a vacuum tube having an anode, a cathode and a control electrode, a variable impedance coupling network interposed between said generator and said tube including a transformer, an input circuit including rectifiers connected between each of the secondaries of said transformer and said photoelectric tube, and an output circuit including said anode and said cathode, the output of said circuit decreasing in response to an increase in the quantity of light received from the image, the relative output increase being determined by the impedance of said network.

18. A modulation system of the type suitable for transmitting signals defining a facsimile of an image comprising a carrier wave generator, a photoelectric tube responsive to an increase of light due to an optical characteristic of the image, a vacuum tube having an anode, a cathode and a control electrode, a coupling network with a variable impedance interposed between said generator and said tube, said network also including two voltage dividing elements, an input circuit including a rectifier connected between each of the respective voltage dividing elements and said photoelectric tube, and an output circuit connected in series with said anode and cathode, the output of said circuit increasing in response to an increase in the quantity of light received from the image, the relative output being determined by the adjustment of said impedance.

19. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network including voltage dividing impedances interposed between said generator and said control electrodes, an adjustable attenuator connected between said control electrodes and an input circuit including a rectifier, a resistor and one of said impedances connected in series between each of the respective control electrodes and said photoelectric tube, said impedances also being connected in series between said control electrodes whereby the carrier wave is alternately impressed upon the respective control electrodes, the magnitude of the modulated output of said push-pull circuit being determined by the adjustment of said attenuator.

20. A modulation system of the type suitable for transmitting signals defining a facsimile of an image comprising a carrier wave generator, a photoelectric tube responsive to an increase of light due to an optical characteristic of the image, a push-pull circuit with two vacuum tubes each having an anode, a cathode and a control electrode, a coupling network with two resistors interposed between said generator and said control electrodes, said network also including two voltage dividing impedances connecting in series between said control electrodes, an adjustable attenuator connected between said control electrodes, and an input circuit including a rectifier connected between each of the respective impedances and the photoelectric tube whereby the carrier wave is alternately impressed upon the respective control electrodes, the magnitude of the modulated output of said push-pull circuit being determined by the adjustment of said attenuator.

21. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a variable supply of direct potentials connected to said respective cathodes, a push-pull circuit with two vacuum tubes each having an anode, a cathode and a control electrode, a transformer having a primary and two secondary windings linked by a center tap connected to said cathodes, an adjustable attenuator connected between said control electrodes and two input circuits connecting the respective control electrodes to said photoelectric tube, each of said circuits including a series of rectifiers, a resistor and one of said secondary windings, said secondary winding also being connected in series between said control electrodes, said primary winding being connected in parallel with said generator whereby the carrier wave is alternately impressed upon the respective control electrodes, the magnitude of the modulated output of said push-pull circuit being determined by the adjustment of said attenuator.

22. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a variable supply of direct potentials connected to said respective cathodes, a push-pull circuit with two vacuum tubes each having an anode, a cathode and a control electrode, a capacitor coupling each respective control electrode with said generator, an adjustable attenuator connected between said control electrodes, and two input circuits connecting the respective control electrodes to said photoelectric tube, each of said circuits including in series a rectifier and two resistors, the first resistor in each input circuit also being connected in series with one of the capacitors and its associated control electrode, the second resistor being connected in series with the corresponding resistor in the other input circuit between the control electrodes, the common terminal of the second resistors being linked with said cathodes, whereby the carrier wave is alternately impressed upon the respective control electrodes the magnitude of the modulated output of said push-pull circuit being determined by the adjustment of said attenuator.

23. A modulation system of the type suitable for transmitting signals defining a facsimile of an image comprising a carrier wave generator, a photoelectric tube of the multiplier type having an anode and a plurality of cathodes, responsive to an increase of light due to an optical characteristic of the image, a variable supply of direct potential connected to said respective cathodes, a push-pull circuit with two vacuum tubes each having an anode, a cathode and a control electrode, a transformer having a pair of primary windings and a pair of series connected secondary windings with a common center tap linked to said cathodes, an adjustable attenuator connected between said control electrodes, and two input circuits each including a rectifier connecting the respective secondary windings with said photoelectric tube, two resistors connecting the primary windings in series with said generator, each resistor also being in parallel with the control electrode and cathode of a respective tube whereby the carrier wave is alternately impressed upon the respective control electrodes, the magnitude of the modulated output of said push-pull circuit being determined by the adjustment of said attenuator.

24. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network including voltage dividing elements interposed between said generator and said control electrodes, an input circuit including a rectifier, an impedance and one of said voltage dividing elements connected in series between each of the respective control electrodes and said photoelectric tube, said voltage dividing elements also being connected in series between said control electrodes, and a source of direct potential connected between the common terminal of the voltage dividing elements and ground whereby the resulting bias upon the photoelectric tube increases the modulation of said output.

25. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network with two impedances interposed between said generator and said control electrodes, said network also including two voltage dividing elements connecting in series between said control electrodes, an input circuit including a rectifier connected between each of the respective voltage dividing elements and the photoelectric tube, and a source of direct potential connected between the common terminal of the voltage dividing elements and ground whereby the resulting bias upon the photoelectric tube increases the modulation of said output.

26. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a supply of direct potentials connected to said respective cathodes, a push-pull circuit with two vacuum tube elements each having an anode, a cathode and a control electrode, a transformer having a primary and two secondary windings linked by a center tap connected to said cathodes, two input circuits connecting the respective control electrodes to said photoelectric tube, each of said circuits including in series a rectifier, an impedance and one of said secondary windings, said secondaries also being connected in series between said control electrodes, said primary being connected in parallel with said generator, and a source of direct potential connected between the common terminal of the secondary windings and ground whereby the resulting bias upon the photoelectric tube increases the modulation of said output.

27. A modulation system of the type suitable for transmitting signals defining a facsimile of an image comprising a carrier wave generator, a photoelectric tube of the multiplier type having an anode and a plurality of cathodes responsive to an increase of light due to an optical characteristic of the image, a supply of direct potentials connected to said respective cathodes, a push-pull circuit with two vacuum tube elements each having an anode, a cathode and a control electrode, means for coupling each respective control electrode with said generator, two input circuits connecting the respective control electrodes to said photo-electric tube, each of said circuits including in series a rectifier and two impedances, the first impedance in each input circuit also being connected in series with one of the control electrodes, the second impedance being connected in series with the corresponding impedance in the other input circuit between the control electrodes, the common terminal of the second impedance being linked with said cathodes, and a source of direct potential connected between the common terminal of the second impedances and ground whereby the resulting bias upon the photoelectric tube increases the modulation of said output.

28. A modulation system of the type suitable for transmitting signals defining a facsimile of an image comprising a carrier wave generator, a photoelectric tube of the multiplier type having an anode and a plurality of cathodes, responsive to an increase of light due to an optical characteristic of the image, a supply of direct potential connected to said respective cathodes, a push-pull circuit with two vacuum tube elements each having an anode, a cathode and a control electrode, a transformer having a pair of primary windings and a pair of series connected secondary windings with a common center tap linked to said cathodes, two input circuits each including a rectifier connecting the respective secondary windings with said photoelectric tube, two impedances connecting the primary windings in series with said generator, each impedance also being in parallel with the control electrode and cathode of a respective tube, and a source of direct potential connected between the common center tap of said secondary windings and ground whereby the resulting bias upon the photoelectric tube increases the modulation of said output.

29. A modulation system of the type suitable for transmitting signals defining a facsimile of an image comprising a carrier wave generator, a photoelectric tube having an anode and a cathode responsive to an increase of light due to an optical characteristic of the image, a power supply connected to impress a direct potential between the anode and cathode of said photoelectric tube, said power supply including control means for adjusting the magnitude of said direct potential, a push-pull circuit with two vacuum tube elements each having an anode, a cathode and a control electrode, a coupling network including voltage dividing elements interposed between said generator and said control electrodes, and an input circuit including a rectifier, an impedance and one of said voltage dividing elements connected in series between each of the respective control electrodes and said photoelectric tube, said voltage dividing elements also being connected in series between said control electrodes whereby the carrier wave is impressed in opposite phase upon the respective control electrodes, the output of said push-pull circuit decreasing in response to an increase in the quantity of light received from the image, the control means adjustment of the direct potential applied to the anode and cathode of said photoelectric tube determining the relative decrease of the push pull circuit output.

30. A modulation system of the type suitable for transmitting signals defining a facsimile of an image comprising a carrier wave generator, a photoelectric tube responsive to an increase of light due to an optical characteristic of the image, a push-pull circuit with two vacuum tube elements each having an anode, a cathode and a control electrode, a coupling network including voltage dividing elements interposed between said generator and said control electrodes, and an input circuit including a rectifier, an impedance and one of said voltage dividing elements connected in series between each of the respective control electrodes and said photoelectric tube, said voltage dividing elements also being connected in series between said control electrodes whereby the carrier wave is impressed in opposite phase upon the respective control electrodes, said push-pull circuit including a variable impedance for adjusting the decrease in the output thereof.

ALEXANDER NYMAN.

REFERENCES CITED

The following references are of record in the file of this patent:

UNITED STATES PATENTS

| Number | Name | Date |
|---|---|---|
| 1,628,377 | Vogt et al. | May 10, 1927 |
| 2,095,717 | Shore et al. | Oct. 12, 1937 |
| 2,252,752 | Bliss | Aug. 19, 1941 |
| 2,275,020 | Purington | Mar. 3, 1942 |